United States Patent
Ishimori et al.

(10) Patent No.: US 6,360,517 B1
(45) Date of Patent: Mar. 26, 2002

(54) MOWER UNIT

(75) Inventors: Shozo Ishimori, Salao; Nobuyuki Yamashita, Izumi; Hiroki Nagai, Izumiotsu; Hiroshi Oshima, Osaka; Eriya Harada; Hiroshi Kawabata, both of Sakai, all of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/512,227

(22) Filed: Feb. 24, 2000

(30) Foreign Application Priority Data

Aug. 11, 1999 (JP) .......................................... 11-227361

(51) Int. Cl.$^7$ ............................................. A01D 67/00
(52) U.S. Cl. ........................... 56/320.1; 56/255; 56/295
(58) Field of Search ........................ 56/295, 255, 17.5, 56/320.1, 320.2, 16.7, DIG. 20, DIG. 17

(56) References Cited

U.S. PATENT DOCUMENTS

| | | | | |
|---|---|---|---|---|
| 3,601,960 A | * | 8/1971 | Buechler .................... | 56/320.2 |
| 3,636,685 A | | 1/1972 | Speckman .................... | 56/295 |
| 3,888,072 A | * | 6/1975 | Templeton .................. | 56/320.2 |
| 4,099,366 A | * | 7/1978 | Peterson .................... | 56/13.6 |
| 4,254,607 A | | 3/1981 | Moore ........................ | 56/295 |
| 4,290,258 A | | 9/1981 | Gobler ........................ | 56/295 |
| 4,736,576 A | * | 4/1988 | Mallaney et al. ............. | 56/255 |
| 4,774,803 A | | 10/1988 | Kempton ..................... | 56/295 |
| 5,209,052 A | | 5/1993 | Carroll ....................... | 56/255 |
| 5,233,820 A | * | 8/1993 | Willsie ...................... | 56/255 |
| 5,345,788 A | | 9/1994 | Jerry ......................... | 56/255 |
| 5,732,540 A | * | 3/1998 | Smejima et al. ............. | 56/320.1 |
| 6,038,840 A | * | 3/2000 | Ishimori et al. ............. | 56/13.3 |

FOREIGN PATENT DOCUMENTS

JP          H779629          3/1995

OTHER PUBLICATIONS

Partial Translation of Japanese Patent Laying–open Publication H7–79629, 1 page No Date.

* cited by examiner

Primary Examiner—Thomas B. Will
Assistant Examiner—Meredith C. Petravide
(74) Attorney, Agent, or Firm—Webb Ziesenheim Lodgsdon Orkin & Hanson, P.C.

(57) ABSTRACT

A mower unit (B) having a housing (13), blades (12) supported in the housing to be rotatable about vertical axes (P1) acting as the centers of rotation, cutting edges (12A) defined at front edge regions of each blade with respect to a direction of rotation thereof, and lift vanes (12B) erected from rear edge regions of each blade with respect to the direction of rotation thereof. Each of the lift vanes includes a first vane portion (12b) extending the more rearwardly, with respect to the direction of rotation, the farther away the first vane is from the center of rotation, and a second vane portion (12c) bent in the direction of rotation from a radially outward end of the first vane portion.

6 Claims, 6 Drawing Sheets

MOWER UNIT

BACKGROUND OF THE INVENTION

1. Field of the Invention

This invention relates to a mower unit having a housing, blades supported in the housing to be rotatable about vertical axes acting as the centers of rotation, cutting edges defined at front edge regions of each blade with respect to a direction of rotation thereof, and lift vanes erected from rear edge regions of each blade with respect to the direction of rotation thereof.

2. Description of the Related Art

In a conventional mower unit noted above, as disclosed in Japanese Patent Laying-Open Publication H7-79629, for example, outer rear edges of each blade are bent upward to define inwardly facing lift vanes extending the more forwardly, with respect to the direction of rotation, the farther away the lift vanes are radially from the center of rotation of the blade. The lift vanes generate air flows with rotation of the blades to transport grass clippings cut by the blades toward a predetermined discharge opening.

Where the grass clippings transported to the discharge opening are thrown away outside the machine, the carrier air flows produced by the lift vanes are used to throw the grass clippings. Where the grass clippings are transported through a duct to a grass catcher disposed at the rear end of the machine, a fan is provided for producing carrier air flows from the discharge opening toward the grass catcher.

However, where, as in the prior art noted above, the lift vanes are formed to face inwardly, the carrier air flows produced by the lift vanes have strong inwardly directed vector components with respect to loci of rotation of the blades. As a result, a large part of grass clippings rotates with the blades without being transported outside the loci of rotation of the blades. The grass clippings cut by the blades cannot be transported easily toward a predetermined discharge opening.

To avoid such an inconvenience, it is conceivable to provide each blade with outwardly facing lift vanes extending the more rearwardly, with respect to the direction of rotation, the farther away the lift vanes are radially from the center of rotation of the blade (i.e. sweep-back vanes), or lift vanes extending perpendicular to the locus of the blade (i.e. level vanes). Where the outwardly facing lift vanes are provided, the carrier air flows produced by the lift vanes have strong outwardly directed vector components with respect to the loci of rotation of the blades (in directions to strike hard against housing walls). This is effective not only to suppress the grass clippings rotating with the blades, but to collect the grass clippings as entrained by the carrier air flows outwardly of the blades. Thus, the grass clippings cut by the blades may be transported efficiently toward a predetermined discharge opening. On the other hand, the carrier air flows produced by the lift vanes collide with vertical walls of the housing adjacent the blades to generate explosive sounds, thereby giving loud noise. Where the lift vanes extending perpendicular to the locus of each blade are provided, the carrier air flows produced by the lift vanes have strong vector components along tangents to the loci of rotation of the blades. Compared with the outwardly facing lift vanes, these vanes can suppress the noise due to the explosive sounds, but are unable to collect sufficiently the grass clippings as entrained by the carrier air flows outwardly of the blades. There is room for improvement in terms of grass transporting efficiency.

SUMMARY OF THE INVENTION

An object of this invention is to provide a mower unit capable of transporting grass clippings with improved efficiency while achieving noise suppression.

The above object is fulfilled, according to this invention, by a mower unit comprising a housing, blades supported in the housing each to be rotatable about a vertical axis acting as a center of rotation, cutting edges defined at front edge regions of each of the blades with respect to a direction of rotation thereof, and lift vanes erected from rear edge regions of each blade with respect to the direction of rotation thereof, each of the lift vanes including a first vane portion extending the more rearwardly, with respect to the direction of rotation, the farther away the first vane portion is from the center of rotation, and a second vane portion bent in the direction of rotation from a radially outward end of the first vane portion.

With this construction, a rotation of each blade causes the first vane portion to produce carrier air flows with an outward directivity with respect to the locus of rotation of the blade (i.e. carrier air flows having strong vector components rapidly moving away from the locus of rotation), and the second vane portion to produce carrier air flows with a more inward directivity than the carrier air flows from the first vane portion. (i.e. carrier air flows having strong vector components not so rapidly moving away from the locus of rotation than the carrier air flows produced by the first vane portion).

That is, the carrier air flows produced by the first vane portion collect grass clippings cut by the blade radially outwardly of the blade while suppressing the grass clippings rotating with the blade. In addition, the carrier air flows produced by the second vane portion weaken the outward directivity of the grass clippings collected outwardly. This checks a reduction in the transporting capability due to the grass clippings colliding with vertical walls of the housing located adjacent the blade. Thus, the grass clippings cut by the blade are transported efficiently toward a predetermined discharge opening. Moreover, the carrier air flows from the second vane portion weakening the outward directivity of the carrier air flows from the first vane portion have the effect of suppressing an increase of noise due to explosive sounds produced by the carrier air flows produced by the lift vanes colliding with the adjacent vertical walls, and a reduction in the transporting capability due to leakage of the carrier air flows from the housing which would occur with an increase in the outward directivity. In this way, the grass transporting efficiency is effectively improved while suppressing noise.

In a preferred embodiment of this invention, the housing includes a vacuum plate depending from a ceiling thereof and curved to extend along loci of rotation of the blades. Thus, the vacuum plate suppresses leakage of the carrier air flows to allow the carrier air flows to transport the grass clippings efficiently toward the discharge opening of the housing.

In another preferred embodiment of this invention, the vacuum plate has a downwardly converging profile with a lower end thereof disposed closest to the loci of rotation. With this construction, the carrier air flows generated by the rotating blades are caused to flow along the vacuum plate while flowing toward a large space above the blades. This feature suppresses a reduction in the transporting capability due to leakage of the carrier air flows from under the vacuum plate, and enhances erection of uncut grass to provide an improved grass cutting efficiency. The configuration of vacuum plate to be farther away from the blades as it extends upward promotes the effect of suppressing an increase of noise due to explosive sounds produced by the carrier air flows produced by the lift vanes colliding with the vacuum plate.

In a further preferred embodiment of this invention, the housing defines a glass clippings discharge guide path extending along a common tangent of loci of rotation of an adjacent pair of the blades, the adjacent pair of the blades being rotatable in opposite directions so that air flows generated by the lift vanes thereof substantially agree with a discharge direction. With this construction, the carrier air flows from the two blades are discharged in the same direction through the discharge guide path. Moreover, the second vane portions act to weaken the outward directivity of the carrier air flows from the two blades which would hamper the mutual flows in the discharge guide path. Thus, the grass clippings transported by the carrier air flows toward the discharge guide path are allowed to flow swiftly along the discharge guide path by the combined effect of the carrier air flows merging in that guide path. Even where the grass clippings are transported to a grass catcher disposed at the rear end of the machine, the grass clippings may be transported to the grass catcher without requiring a grass collecting fan to supply carrier air flows for transporting the grass clippings from the discharge opening toward the grass catcher.

Other features and advantages of this invention will be apparent from the following description of the embodiments to be taken with reference to the drawings.

DESCRIPTION OF THE PREFERRED EMBODIMENTS

Figure 1:
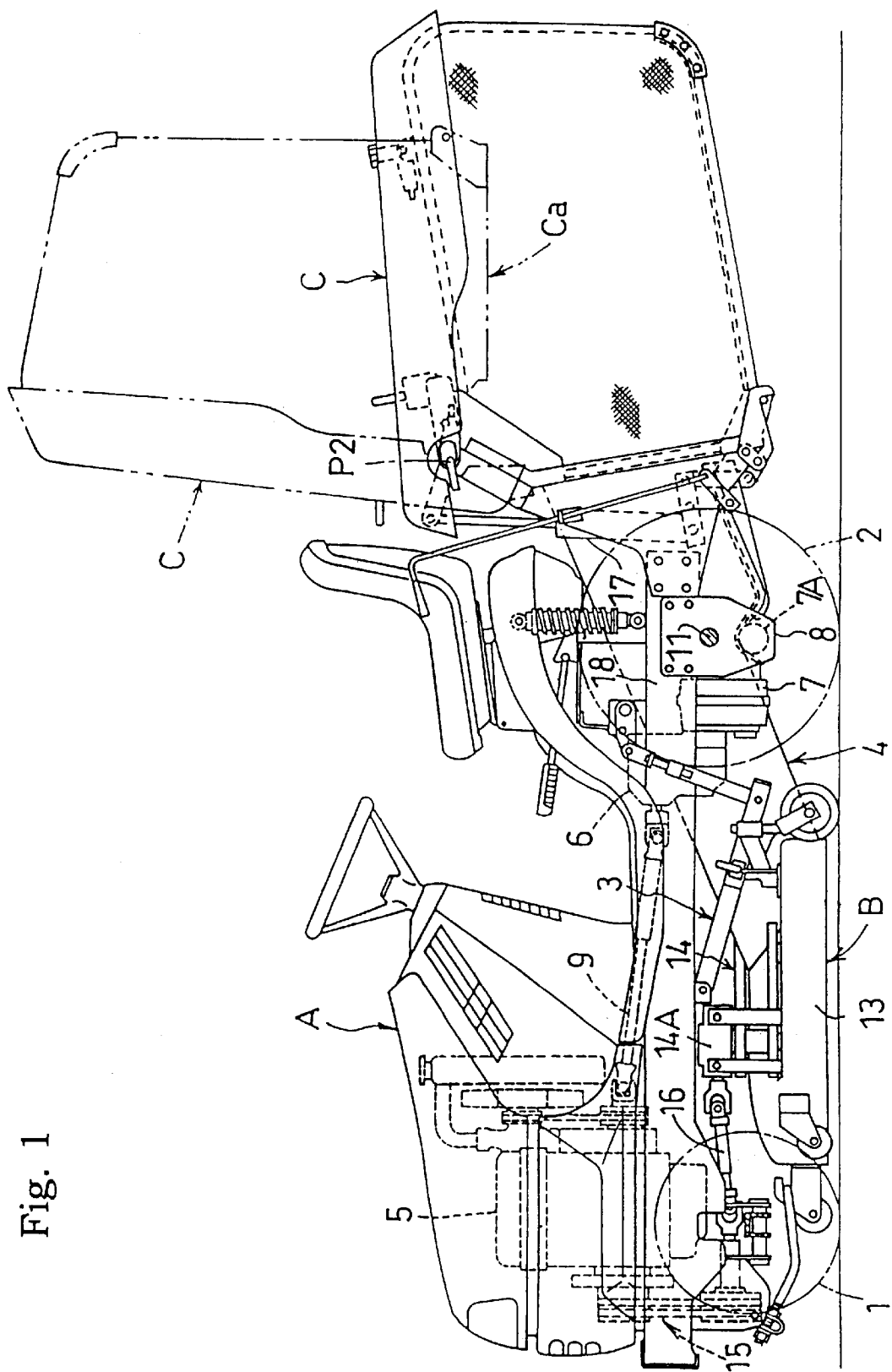
FIG. 1 is a side elevation of a lawn tractor.

FIG. 1 shows a side elevation of a lawn tractor. This lawn tractor includes a vehicle body A having right and left front wheels 1 and right and left rear wheels 2. A mower unit B is vertically movably suspended under the vehicle body A through a raising and lowering link mechanism 3. A grass catcher C is connected to the rear of the vehicle body A for collecting grass clippings discharged from the mower unit B through a duct 4.

Figure 2:
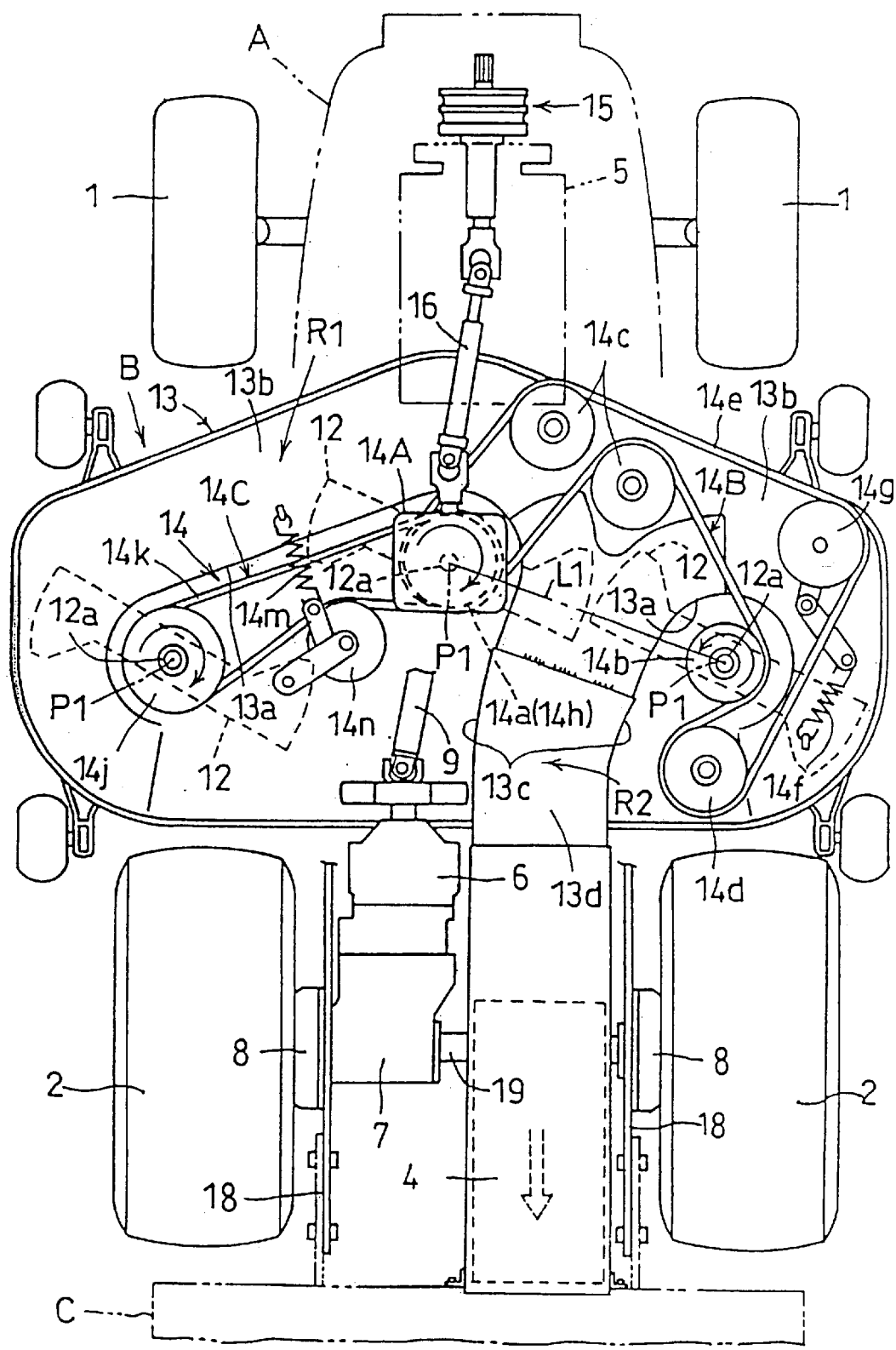
FIG. 2 is a schematic plan view of the lawn tractor showing a transmission structure.
Figure 3:
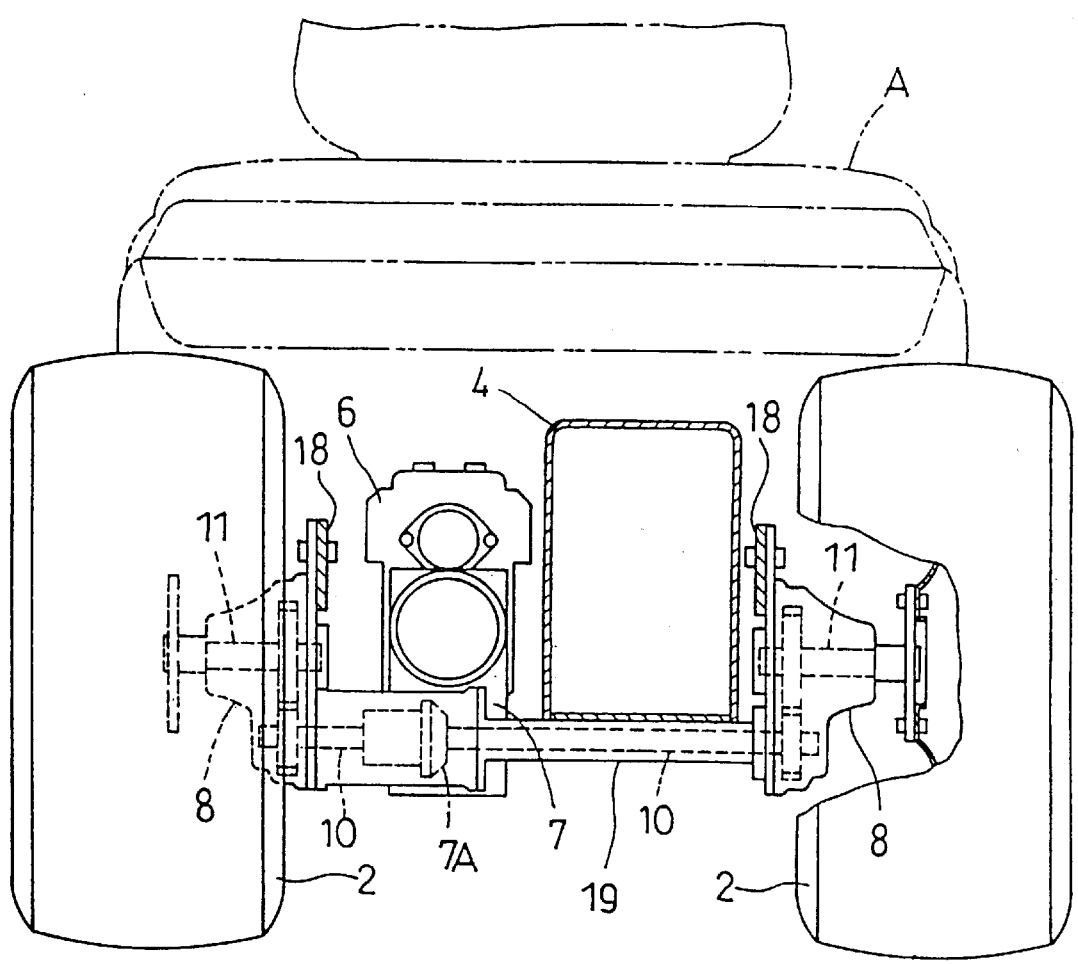
FIG. 3 is a rear view of a vehicle body showing an arrangement of a propelling transmission system.

As shown in FIGS. 1 through 3, the vehicle body A includes an engine 5 mounted on a forward portion thereof, a hydrostatic stepless transmission 6 disposed in a rearward position, a gear type change speed device 7 rigidly connected to the rear of hydrostatic stepless transmission 6, and reduction devices 8 arranged at the right and left sides of the gear type change speed device 7. Propelling drive is transmitted from the engine 5 to the hydrostatic stepless transmission 6 through a transmission shaft 9. After a change speed operation by the hydrostatic stepless transmission 6, the drive is decelerated by the gear type change speed device 7. The decelerated drive is transmitted to the right and left reduction devices 8 from a differential mechanism 7A disposed below the rear end of gear type change speed device 7, through right and left differential shafts 10. The drive is further decelerated by the right and left reduction devices 8, and transmitted to the right and left rear wheels 2 through right and left rear axles 11.

As shown in FIGS. 1 and 2, the mower unit B includes three blades 12 arranged transversely of the vehicle body, a housing 13 for supporting these blades 12 to be rotatable about vertical axes P1, and a belt transmission mechanism 14 disposed above the housing 13. The drive of engine 5 is transmitted to the belt transmission mechanism 14 through a belt tension type operational clutch 15 and a transmission shaft 16, and from the belt transmission mechanism 14 to each blade 12.

As shown in FIG. 1, the grass catcher C is vertically pivotable about a pivotal axis P2 set to an upper forward position thereof, by a hydraulic cylinder 17 disposed rearwardly of the gear type change speed device 7. Thus, the grass catcher C is switchable between an operative position with a front opening Ca thereof communicating with the duct 4, and a discharge position with the opening Ca directed downward to discharge grass clippings collected through the duct 4.

As shown in FIGS. 1 through 3, the left reduction device 8 on the vehicle body A has an upper right surface thereof connected to a left body frame 18, and a lower right surface connected to the gear type change speed device 7. The right reduction device 8 has an upper left surface thereof connected to a right body frame 18, and a lower left surface connected to the gear type change speed device 7 through a differential shaft case 19 surrounding the right differential shaft 10. With this construction, the hydrostatic stepless transmission 6 and gear type change speed device 7 are offset leftward of the vehicle body A. This offset arrangement provides a large space between the gear type change speed device 7, right reduction device 8 and differential shaft case 19 for accommodating the duct 4.

Figure 4:
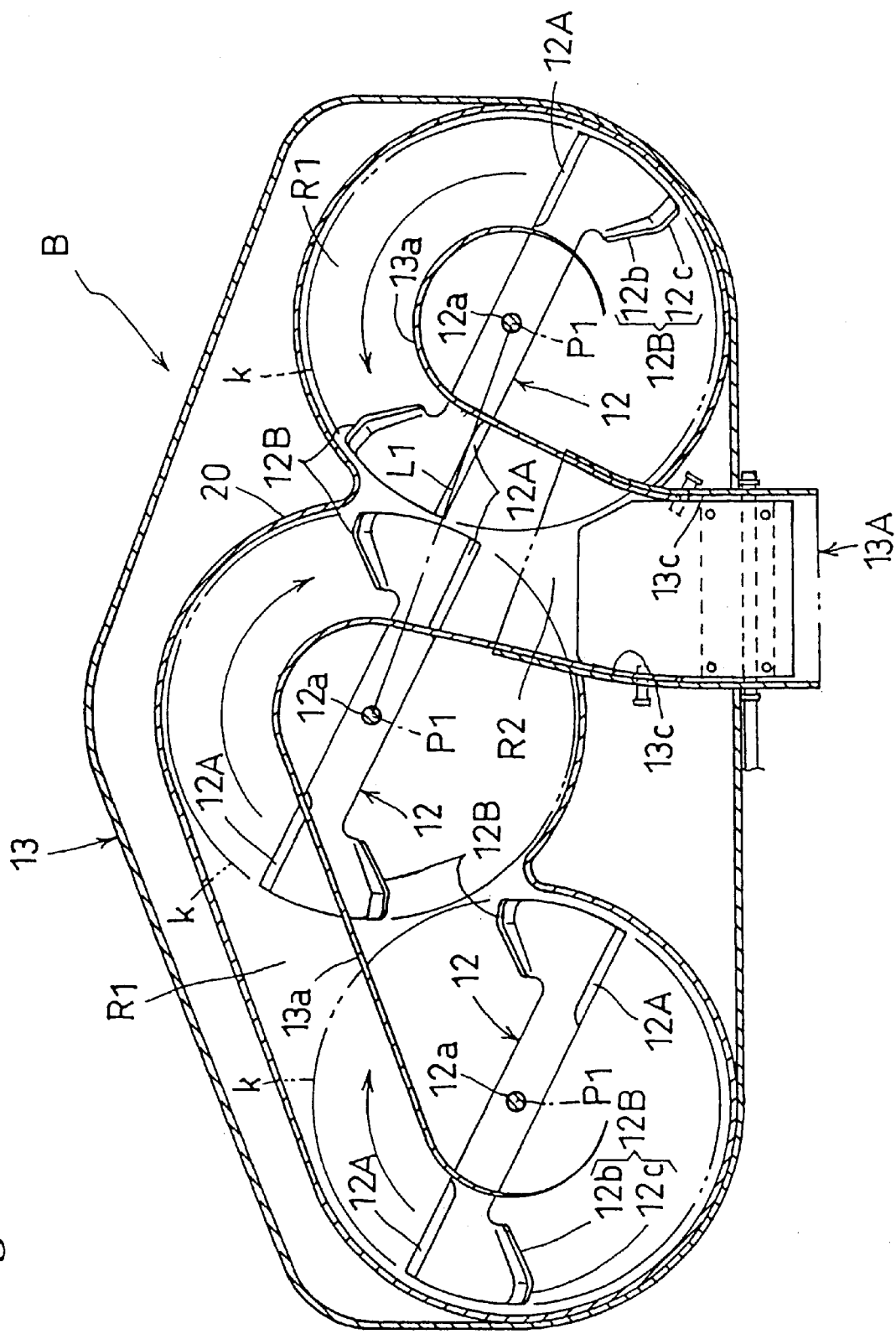
FIG. 4 is a cross section of a mower unit.
Figure 5:
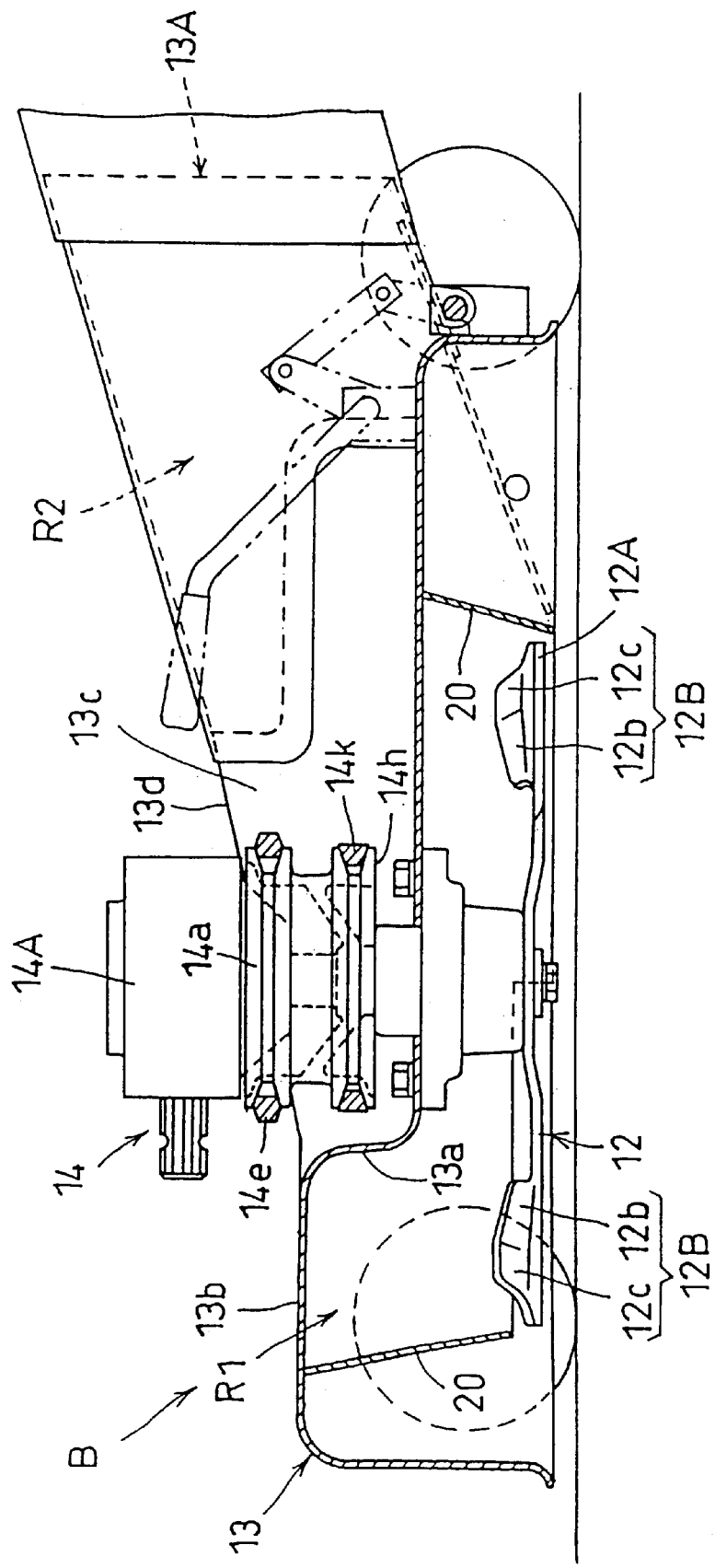
FIG. 5 is a side view in vertical section of the mower unit.

As shown in FIGS. 2, 4 and 5, the housing 13 of mower unit B includes a transport guide path R1 for guiding grass clippings from each blade 12 toward a region between the vertical axes P1 of the center blade 12 and right blade 12 which are one example of predetermined adjacent blades 12, and a discharge guide path R2 extending rearward and upward for guiding the grass clippings rearward and upward from between the vertical axes P1. That is, the mower unit B is the rear discharge type for rearwardly discharging grass clippings cut by each blade 12. The transport guide path R1 is defined by a vacuum plate 20 depending from the housing 13 and curved to extend substantially along loci k of rotation of the blades 12, right and left vertical inner walls 13a of the housing 13 spaced a predetermined distance from to the vacuum plate 20, and a first upper wall portion 13b of housing 13 extending between the vacuum plate 20 and right and left vertical inner walls 13a. The discharge guide path R2 is defined by opposed right and left vertical walls 13c between the vertical axis P1 of center blade 12 and the vertical axis P1 of right blade 12, and a second upper wall portion 13d of housing 13 extending between the right and left vertical walls 13c.

As shown in FIGS. 2 and 5, the belt transmission mechanism 14 of mower unit B includes an input unit 14A for drivably connecting a support shaft 12a of center blade 12 to the transmission shaft 16, an opposite rotation transmitting portion 14B for rotating the center blade 12 and right blade 12 in opposite directions so that the two blades 12 move from front to rear in the discharge guide path R2, and a forward rotation transmitting portion 14C for rotating the center blade 12 and left blade 12 in the same direction. With this construction, grass clippings cut by the blades 12 are led through the transport guide path R1 to the discharge guide path R2 by air flows generated by rotation of the blades 12.

The opposite rotation transmitting portion 14B includes a first driving pulley 14a rotatable with the support shaft 12a of center blade 12, a first driven pulley 14b rotatable with a support shaft 12a of right blade 12, a pair of relay pulleys 14c disposed between these pulleys 14a and 14b, an auxiliary pulley 14d disposed rearwardly of the first driven pulley 14b, a transmission belt 14e wound around these pulleys 14a–14d, with its back surface contacting the first driven pulley 14b, and a tension pulley 14g biased by a spring 14f to maintain the transmission belt 14e in tension. V-pulleys are employed for the pulleys 14a–14d and 14g of opposite rotation transmitting portion 14B, and a hexagonal belt for the transmission belt 14e (see FIG. 5).

The forward rotation transmitting portion 14C includes a second driving pulley 14h rotatable with the support shaft 12a of center blade 12, a second driven pulley 14j rotatable with a support shaft 12a of left blade 12, a transmission belt 14k wound around these pulleys 14h and 14j, and a tension pulley 14n biased by a spring 14m to maintain the transmission belt 14k in tension. V-pulleys are employed for the pulleys 14h, 14j and 14n, and a V-belt for the transmission belt 14k (see FIG. 5).

As shown in FIGS. 2 and 4, the pair of relay pulleys 14c in the opposite rotation transmitting portion 14B are disposed forwardly of a line L1 linking the vertical axis P1 of center blade 12 and the vertical axis P1 of right blade 12. Thus, the opposite rotation transmitting portion 14B extends around a position forwardly of the line L1, allowing the forward end of discharge guide path R2 to be located forwardly of the line L1.

As a result, in the discharge guide path R2, the center blade 12 and right blade 12 rotate substantially along the discharge guide path R2. Carrier air flows generated by rotation of these blades 12 have a flowing direction in agreement with a grass guiding direction of discharge guide path R2. Thus, grass clippings transported by the carrier air flows are smoothly led into the discharge guide path R2, and allowed to flow swiftly along the discharge guide path R2.

Figure 6:
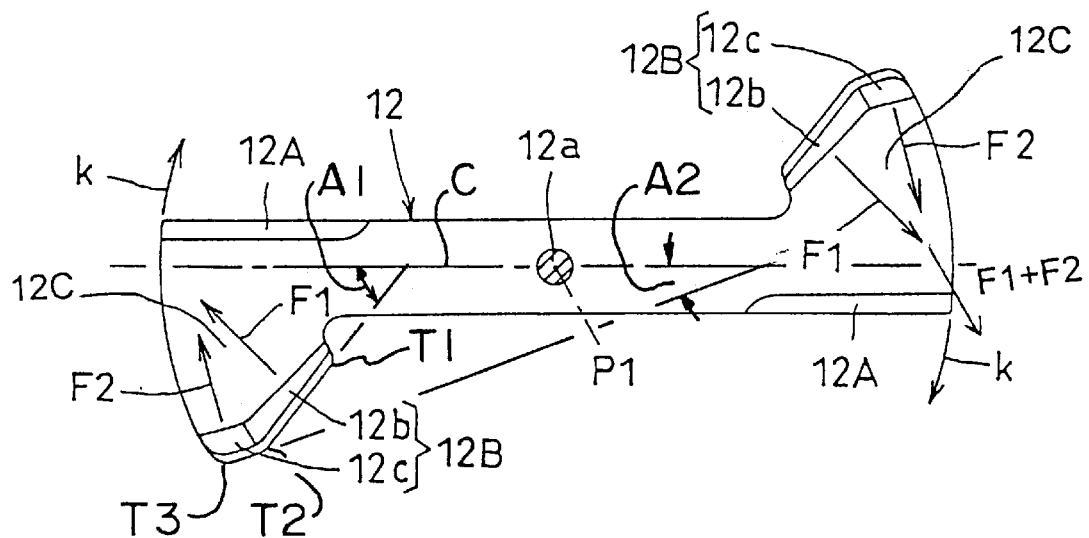
FIG. 6 is a plan view of a blade.

As shown in FIGS. 4 through 6, each blade 12 has cutting edges 12A for cutting grass with rotation of the blade, which are formed at forward ends of regions radially outwardly of the center of rotation of the blade. Extensions 12C project from rearward ends of the regions radially outwardly of the center of rotation of the blade. These extensions 12C have surfaces of smooth transition from a main body surface of the blade 12. Lift vanes 12B project upward from rear ends of the extensions 12C for generating carrier air flows with rotation of the blade 12. Each blade 12 defines forwardly inclined outward regions to suppress an increase in the grass cutting resistance due to uncut portions of the grass in sliding contact with the lower surface of blade 12, thereby providing an improved grass cutting performance.

Each blade 12 has a centerline C which intersects with the vertical axis P1 and bisects the blade 12. Each lift vane 12B includes a first vane portion 12b defined by a first point T1 and a second point T2, wherein the first vane portion 12b extends from the first point T1 radially outwardly and rearwardly with respect to the direction of rotation to the second point T2 and wherein a line L1 connecting the first point T1 and the second point T2 defines a first vane angle A1 relative to the blade centerline C, and a second vane portion 12c slightly bent in the direction of rotation from a radially outward end of the first vane portion 12b. Thus, the second vane portion 12c is adjacent to the first vane portion 12b and defined by the second point T2 and a third point T3, wherein the second vane portion 12c extends from the second point T2 radially outward and rearwardly with respect to the direction of rotation to the third point T3 and wherein a line L2 connecting the second point T2 and the third point T3 defines a second vane angle A2 which is less than the first vane angle A1. With this bent configuration, each lift vane 12B forms a recess facing the direction of rotation, see FIG. 6.

With the above configuration of each lift vane 12B, a rotation of blade 12 causes the first vane portion 12b to produce carrier air flows having an outward directivity (vector F1) with respect to the locus k of rotation of blade 12, and the second vane portion 12c to produce carrier air flows an inward directivity (vector F2) with respect to the locus k of rotation of blade, which air flows are turned more inwardly than the air flows produced by the first vane portion 12b. Here, a resultant vector F1+F2 of the resultant vector F1 of air flows produced by the first vane portion 12b and the resultant vector F2 of air flows produced by the second vane portion 12c also has a direction to move away from the center of rotation of blade 12, that is to move directly out of the locus k of rotation of blade 12.

Consequently, the carrier air flows from the first vane portion 12b have the effect of collecting grass clippings cut by the blade 12 toward the outer edge of blade 12 having a high rotating speed while suppressing the grass clippings from rotating with the blade. In addition, the carrier air flows from the second vane portion 12c have the effect of weakening the outward directivity of the grass clippings collected toward the outer edge. This checks a reduction in the transporting capability due to the grass clippings colliding with the vacuum plate 20 acting as vertical wall of housing 13 located adjacent the blade 12. Thus, the grass clippings cut by the blade 12 are transported efficiently toward a discharge opening 13A of housing 13. Moreover, the carrier air flows F2 from the second vane portion 12c weakening the outward directivity of carrier air flows F1 from the first vane portion 12b have the effect of suppressing an increase of noise due to explosive sounds produced by the carrier air flows produced by the lift vanes 12B as a whole colliding with the vacuum plate 20, and a reduction in the transporting capability due to leakage of the carrier air flows from the guide paths R1 and R2 which would occur with an increase in the outward directivity.

As shown in FIG. 5, the vacuum plate 20 has a configuration diverging upward to move away from the loci k of rotation of the blades 12 as the vacuum plate 20 extends upward. This is one example of configurations converging to be closer toward the loci k of rotation of the blades 12 as the vacuum plate 20 extends downward from a vertically intermediate position thereof. Consequently, the carrier air flows F1 and F2 generated by rotating blades 12 are caused to flow along the vacuum plate 20 while flowing toward a large space above the blades 12. This feature suppresses a reduction in the transporting capability due to leakage of the carrier air flows F1 and F2 from under the vacuum plate 20, and enhances erection of uncut grass to provide an improved grass cutting efficiency. The configuration of vacuum plate 20 to be farther away from the blades 12 as it extends upward promotes the effect of suppressing an increase of noise due to explosive sounds produced by the carrier air flows F1 and F2 produced by the lift vanes 12B colliding with the vacuum plate 20.

Other embodiments of this invention will be described briefly hereinafter.

The mower unit B may be the side discharge type.

The number of blades 12 included in the mower unit B is variable.

The exhaust guide path R2 may be formed between a varied adjacent pair of blades 12. In the above embodiment, for example, the center blade 12 and left blade 12 may be selected as the adjacent pair of blades 12.

The second vane portion 12c of each lift vane 12B may extend perpendicular to the locus k of rotation of blade 12 or may be disposed the more upstream with respect to the direction of rotation of blade 12 as it extends outward, as long as the second vane portion 12c is disposed outwardly of the first vane portion 12b and faces more inwardly than the first vane portion 12b.

Figure 7A:
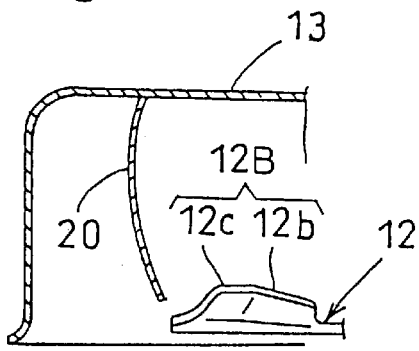
FIGS. 7A through 7D are fragmentary side views in vertical section showing shapes of vacuum plates in different embodiments.
Figure 7B:
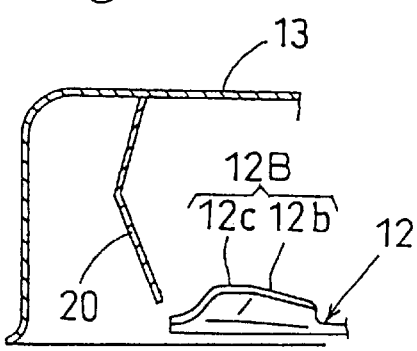
Figure 7C:
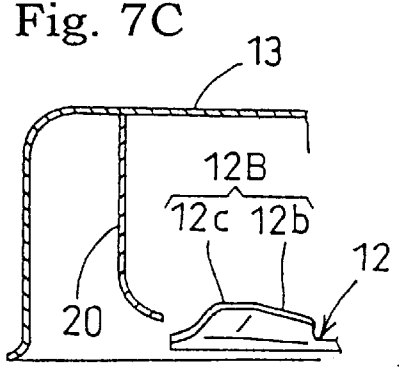
Figure 7D:
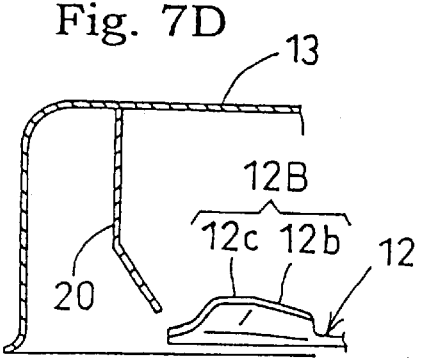

The vacuum plate 20 may have varied configurations converging to be closer toward the loci k of rotation of the blades 12 as the vacuum plate 20 extends downward from a vertically intermediate position thereof. For example, the vacuum plate 20 may be curved as shown in FIG. 7A or bent as shown in FIG. 7B. The vacuum plate 20 may be curved as shown in FIG. 7C or bent as shown in FIG. 7D, both with an upper portion thereof extending perpendicular to the housing 13. With these configurations, compared with the upwardly diverging configuration illustrated in the foregoing embodiment, the vacuum plate 20 forms large angles with the housing 13 in the transport guide path R1. This is effective to check wet grass clippings adhering between the housing 13 and vacuum plate 20 to impair transport of the grass clippings. In this way, the grass clippings transporting efficiency may be improved.

What is claim is:

1. A mower unit comprising;
    a housing;
    blades supported in said housing on each to be rotatable about a vertical axis acting as a center of rotation wherein each blade has a centerline intersecting with the vertical axis and bisecting the blade;
    cutting edges defined at front edge regions of each of said blades with respect to a direction of rotation thereof; and
    lift vanes defined at rear edge regions of each blade with respect to the direction of rotation thereof, each of said lift vanes including:
        a first vane portion defined by a first point and a second point, wherein the first vane portion extends from the first point radially outwardly and rearwardly with respect to the direction of rotation to the second point and wherein a line connecting the first point and the second point defines a first vane angle relative to the blade centerline; and
        a second vane portion adjacent to the first vane portion defined by the second point and a third point, wherein the second vane portion extends from the second point radially outward and rearwardly with respect to the direction of rotation to the third point and wherein a line connecting the second point and the third point defines a second vane angle which is less than the first vane angle.

2. A mower unit as defined in claim 1, wherein said housing includes a vacuum plate depending from a ceiling thereof and curved to extend along loci of rotation of said blades.

3. A mower unit as defined in claim 2, wherein said vacuum plate has a downwardly converging profile with a lower end thereof disposed closest to said loci of rotation.

4. A mower unit as defined in claim 1, wherein said housing defines a grass clippings discharge guide path extending along a common tangent of loci of rotation of an adjacent pair of said blades, said adjacent pair of said blades being rotatable in opposite directions so that air flows generated by the lift vanes thereof substantially agree with a discharge direction.

5. A mower unit as defined in claim 1, wherein:
    said first vane portion is profiled such that a resultant vector (F1) of air flows produced thereby has a direction away from said center of rotation; and
    said second vane portion is profiled such that a resultant (F1+F2) of a resultant vector (F2) of air flows produced thereby and the resultant vector (F1) of air flows produced by said first vane portion has a direction away from said center of rotation by a less degree than the resultant vector (F1) of air flows produced by said first vane portion alone.

6. A mower unit as defined in claim 1, wherein each of said blades defines extensions protruding rearward from said rear edge regions of each blade with respect to the direction of rotation thereof, said lift vanes being erected from said extensions.

* * * * *